United States Patent [19]
Kohmura et al.

[11] 3,936,309
[45] Feb. 3, 1976

[54] HEAT-SENSITIVE RECORDING COMPOSITION AND SHEET

[75] Inventors: Isao Kohmura; Kiyoshi Futaki, both of Kyoto; Yukio Tahara, Takasago, all of Japan

[73] Assignee: Mitsubishi Paper Mills, Ltd., Japan

[22] Filed: July 18, 1973

[21] Appl. No.: 380,238

[30] Foreign Application Priority Data

Aug. 5, 1972 Japan .............................. 47-78026

[52] U.S. Cl. ....................... 106/21; 106/22; 106/24; 106/25; 106/26; 260/42.21

[51] Int. Cl.$^2$ ......................................... C09D 11/04

[58] Field of Search ............................ 106/20–23, 106/26; 117/36.1, 36.2, 36.8, 1.7, 3.4, 62.2; 96/114.1, 35.1; 204/159.23; 260/42.21, 42.28; 427/146, 150

[56] References Cited

UNITED STATES PATENTS

| | | | |
|---|---|---|---|
| 2,479,037 | 8/1949 | Chambers | 106/26 |
| 3,357,831 | 12/1967 | Wu | 96/35.1 X |
| 3,450,613 | 6/1969 | Steinberg | 204/159.23 X |
| 3,497,353 | 2/1970 | Steppan et al. | 96/35.1 X |
| 3,560,229 | 2/1971 | Farnham et al. | 106/21 |
| 3,654,193 | 4/1972 | Steiner | 117/36.1 X |
| 3,695,904 | 10/1972 | Coleman | 117/62.2 X |
| 3,721,617 | 3/1973 | Watt | 204/159.23 X |
| 3,751,249 | 8/1973 | Hiller | 117/36.8 X |
| 3,761,270 | 9/1973 | de Mauriac et al. | 96/114.1 X |
| 3,770,602 | 11/1973 | D'Alelio | 204/159.23 |
| 3,829,401 | 8/1974 | Futaki et al. | 117/36.2 |
| 3,859,112 | 1/1975 | Kohmura et al. | 117/36.8 |

*Primary Examiner*—Lorenzo B. Hayes
*Attorney, Agent, or Firm*—Cushman, Darby & Cushman

[57] ABSTRACT

A heat-sensitive recording composition comprising a normally colorless or pale-colored chromogenic substance, a phenolic substance capable of developing the color of said chromogenic substance at an elevated temperature, and a water-soluble binder is not water resistant, but when incorporated with a compound having 2 to 10 1,2-epoxy ring structures

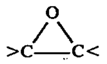

in one molecule as a hardener for said binder, the composition is rendered highly water resistant. Further, a coating liquid containing the said composition is prevented from coloration, and a recording sheet prepared by coating the said coating liquid on a support is prevented from coloration in texture.

14 Claims, No Drawings

HEAT-SENSITIVE RECORDING COMPOSITION AND SHEET

BACKGROUND OF THE INVENTION

This invention relates to a heat-sensitive recording composition and a recording sheet prepared by use of said composition. More particularly, the invention pertains to a heat-sensitive recording composition comprising a normally colorless or pale-colored chromogenic substance, a phenolic substance capable of developing the color of said chromogenic substance at an elevated temperature, and a water-soluble binder, characterized by containing as a hardener for said binder a compound having 2 to 10 1,2-epoxy ring structures in one molecule, and to a recording sheet prepared by use of said composition.

Heretofore, the fact that a chromogenic substance such as Crystal Violet Lactone, for example, reacts with a phenolic substance to form a color has been well known according to O. Fischer and F. Romer: Berichte der Deutschen Chemishen Gesellschaft, Vol. 42, pages 2934 – 2936 (1909). Further, applications of the above-mentioned reaction to heat-sensitive recording sheets have also been well known according to, for example, Japanese patent publication No. 14,039/70.

The heat-sensitive recording sheet of the present invention, in which are used a normally colorless of pale-colored chromogenic substance and a phenolic substance, is prepared by individually dispersing fine particles of the above-mentioned two substances in an aqueous medium containing a binder, mixing the resulting dispersions with each other, adding to the mixed dispersion a compound having 2 to 10 1,2-epoxy ring structures, and coating the resulting composition on a support, followed by drying.

As a binder for use in a heat-sensitive recording composition comprising the above-mentioned chromogenic substance and phenolic substance, there may be shown polyvinyl alcohol, methyl cellulose, hydroxyethyl cellulose, gum arabic, gelatin, styrene-maleic anhydride copolymer or acrylic resin. However, a heat-sensitive recording sheet prepared by coating the said composition by use of the above-mentioned water-soluble binder has no water resistance at all, and when water is spilt or dropped on the recording sheet, the surface coating is undesirably flowed away or stained. Accordingly, it is necessary to harden the coating layer to make the recording sheet water-resistant.

As crosslinking hardeners for the above-mentioned water-soluble binders, there have been known formalin, glyoxal, chromium alumn and melamine-formalin resin. These hardeners, however, have such drawbacks that they crosslink during preparation of coating liquids, thereby agglomerating the coating liquids to make them uncoatable, they have little hardening effects, and they bring about marked coloration in texture of recording sheets.

SUMMARY OF THE INVENTION

According to the present invention, a compound having 2 to 10 1,2-epoxy ring structures

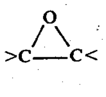

in one molecule is added to a heat-sensitive recording composition comprising a somewhat pale-colored chromogenic substance, a phenolic substance and a binder, whereby the aforesaid drawbacks of the prior art are overcome to make it possible to obtain a heat-sensitive recording sheet excellent in water resistance.

That is, when a compound having 2 to 10 1,2-epoxy ring structures in one molecule is used as the hardener, the coating liquid becomes so stable as to cause no agglomeration or viscosity increase even when allowed to stand for one day and is scarcely colored. When the coating liquid is coated on a support and dried, the resulting coating shows a high water resistance and is not peeled off or stained even when wetted with water and then rubbed with a finger. Further, the degree of coloration in texture of the recording sheet can be made lower by addition of the above-mentioned compound having epoxy ring structures. Thus, the said compound has a great effect on the prevention of the recording sheet from coloration in texture as well.

DESCRIPTION OF THE PREFERRED EMBODIMENT

Typical examples of the compound having 2 to 10 1,2-epoxy ring structures in one molecule are as shown below, though these are not limitative.

(1)

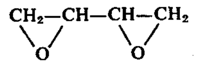

(2)

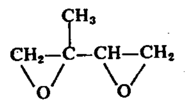

(3)

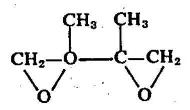

(4)

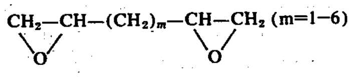

(5)

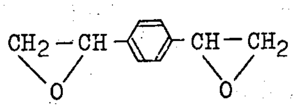

(6)

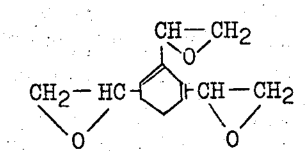

(7)

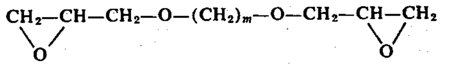

(m=2–10)

(8)

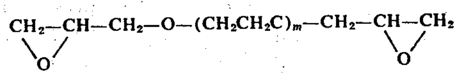

(m=2,3)

(9) 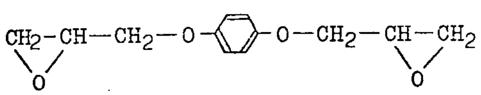

(10) 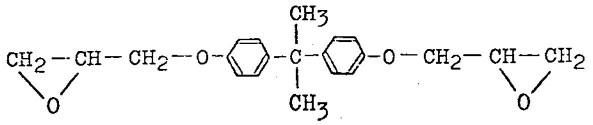

(11) 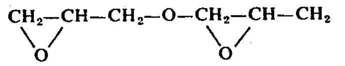

(12) 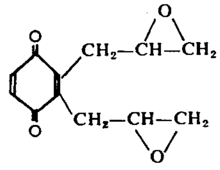

(13) 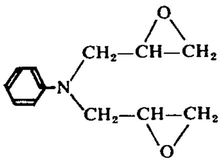

(14) 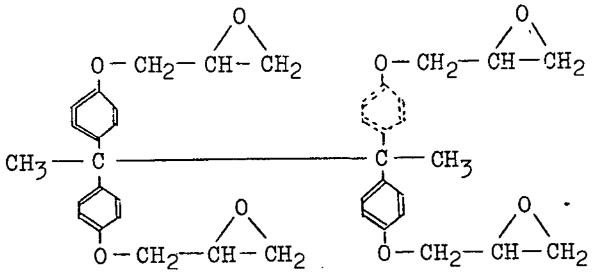

(15) 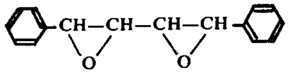

The above-mentioned compound, i.e., hardener, is used in an amount within the range from 0.1 to 30 % by weight, preferably from 0.5 to 20 % by weight, based on the weight of the water-soluble binder.

Typical examples of the normally colorless or somewhat pale-colored substance used in the present invention are as shown below, though these are not limitative.

Crystal Violet Lactone
Malachite Green Lactone
3,3-Bis(p-dimethylaminophenyl)-6-aminophthalide
3,3-Bis(p-dimethylaminophenyl)-6-p-(toluenesulfonamide)phthalide
3-Diethylamino-7-dibenzylaminofluoran
3-Diethylamino-7-(N-methylanilino)fluoran
3-Diethylamino-7-(N-methyl-p-toluidino)fluoran
3-Dimethylamino-6-methoxyfluoran
3-Diethylamino-7-chlorofluoran
3-Diethylamino-6-methyl-7-chlorofluoran
3-Dibutylamino-6-methyl-7-chlorofluoran
3-Diethylamino-7-phenylfluoran
3-Morpholino-5,6-benzofluoran
6'-Chloro-8'-methoxyindolino-benzospiropyran The phenolic substance used in the present invention is a compound which liquefies or vaporizes above at normal temperature, preferably above 70°C., and reacts with the aforesaid chromogenic compound to develop the color of the chromogenic compound. Typical examples of the phenolic substance are as shown below, though these are not limitative.

4,4'-Isopropylidene diphenol
4,4'-Isopropylidenebis(2-chlorophenol)
4,4'-Isopropylidenebis(2-tert-butylphenol)
4,4'-sec-Butylidenediphenol
p,p'-(1-Methyl-n-hexylidene)diphenol
4-Phenylphenol
4-Hydroxydiphenoxide
Methyl-4-hydroxybenzoate
Phenyl-4-hydroxybenzoate
4-Hydroxyacetophenone.
Salicylanilide
Novolak type phenol resin
Halogenated novolak type phenol resin
α-Naphthol
β-Naphthol Among these, the phenolic substances having at least 2 hydroxy groups in one molecule display particularly prominent effects. It is also possible to lower the coloration temperature of the recording sheet by using a mixture of 2 or more of the phenolic substances.

The binder used in the present invention is such a binder as mentioned previously which is ordinarily used in combination with the above-mentioned chromogenic substance and phenolic substance. Preferably, however, the binder is used in combination with hydroxyethyl cellulose and a styrene-maleic anhydride copolymer.

In the present invention, the normally colorless or pale-colored chromogenic substance, the phenolic substance, etc. are dispersed in the above-mentioned binder. In this case, the substances to be dispersed are desirably pulverized as far as possible by means of a pulverizer such as a ball mill or the like so as to have a particle size of less than several microns. If necessary, the pulverization may be carried out in the presence of defoaming agent, dispersing agent and the like active agent. At the time of preparation of a coating liquid of the heat-sensitive recording composition, a filler such as talc, clay or starch may be added in order to enhance the whiteness of the recording paper or to prevent the coating from adherence to thermal head at the time of thermal recording, or a surface active agent or the like may be added in order to enhance the coatability of the coating liquid. Further, a wax or the like may be incorporated into the dispersion in order to minimize such pressure coloration that the recording sheet is colored due to scratch, abrasion or pressure to stain the texture thereof.

The support used in the present invention is ordinarily a paper. Alternatively, however, a synthetic resin film or a sheet of woven cloth may also be used.

The present invention is illustrated in more detail below with reference to examples.

Example 1

| Liquid A: | |
|---|---|
| Crystal Violet Lactone | 1 g. |
| 20 % Aqueous styrene-maleic anhydride copolymer solution (trade name "Malon MS" produced by Daido Kogyo K.K.) | 1 g. |
| Water | 4 g. |
| **Liquid B:** | |
| 4,4'-Isopropylidene diphenol | 6 g. |
| 20 % Aqueous styrene-maleic anhydride copolymer solution | 6 g. |
| Water | 24 g. |

The above-mentioned liquids A and B were individually pulverized in a ball mill for 2 days, and then mixed with each other. The mixed liquid was sufficiently mixed with 0.7 cc. of a 10 % aqueous solution of 1,2-bis(2,3-epoxypropoxy) ethane [the compound (7) (m=2)] to form a heat-sensitive coating liquid. This coating liquid was coated on an ordinary paper having a basis weight of 50 g/m², so that the amount of the coated liquid after drying became about 3 g/m², to obtain a heat-sensitive recording sheet.

For comparison, heat-sensitive recording sheets were prepared in the same manner as above, except that any of the hardeners shown in Table 1 was used in place of the 1,2-bis(2,3-epoxypropoxy)ethane.

Properties of these heat-sensitive recording sheets were as set forth in Table 1.

As is clear from Table 1, the coating liquid containing potassium alum or chromium alumn is so agglomerated as not to be coatable, and the coating liquid containing formalin, glyoxal or no hardener cannot form a water-resistant coating. In contrast to this, the coating liquid containing 1,2-bis(2,3-epoxypropoxy)ethane is not agglomerated and can give a coating which is sufficiently high in water resistance and is not stained or peeled off even when wetted with water and then rubbed with a finger. Further, the texture of the recording sheet containing the said compound according to the present invention is whiter than that of a recording sheet containing no hardener, and thus the above-mentioned compound is high in effect of preventing the coloration in texture of the recording sheet, as well.

Table 1

| | Hardener | Agglomeration of coating liquid | Water resistance | Texture coloration | Remarks |
|---|---|---|---|---|---|
| 1 | No hardener used | None | Low | More or less | Control |
| 2 | 1,2-Bis(2,3-epoxypropoxy) ethane | None | High | None | Present invention |
| 3 | Formalin | None | Low | More or less | Control |
| 4 | Glyoxal | None | Low | Marked | ″ |
| 5 | Chromium alum | Observed | Untestable | untestable | ″ |
| 6 | Potassium alum | ″ | ″ | ″ | ″ |
| 7 | Melamine-formalin resin (trade name "Sumirez Resin 613" produced by Sumitomo Kagaku Kogyo K.K.) | More or less | Low | Marked | ″ |
| 8 | Polyethylene oxide (trade name "Alkox E-30" produced by Meisei Kagaku K.K.) | None | Medium | Marked | ″ |
| 9 | Alkylketone dimer (trade name "Newpel No. 2000" produced by Arakawa Rinsan K.K.) | None | Low | Marked | ″ |

EXAMPLE 2

A heat-sensitive recording sheet was prepared in the same manner as in Example 1, except that polyvinyl alcohol (trade name "Gosenol NH-20" produced by Nippon Gosei Kagaku K.K.) was used in place of the styrene-maleic anhydride copolymer and $\beta$-(2,3-epoxypropoxy)ethyl ether [the compound (8) (m=2)] was used in place of the 1,2-bis(3,4-epoxypropoxy)ethane. This recording sheet was also high in water resistance and less in texture coloration.

EXAMPLE 3

A heat-sensitive recording sheet was prepared in the same manner as in Example 1, except that 3-ethylamino-7-chlorofluoran was used in place of the Crystal Violet Lactone, hydroxyethyl cellulose (trade name "HEC BL-15" produced by Fuji Chemical K.K.) was used in place of the styrene-maleic anhydride copolymer, and 1,4-bis(2,3-epoxypropoxy)butane [the compound (7) (m=4)] was used in place of the 1,2-bis(2,3-epoxypropoxy)ethane. This recording sheet was high in water resistance and less in texture coloration, and thus was an excellent red color-developing recording sheet.

Example 4

| Liquid A: | |
|---|---|
| 3-Diethylamino-7-(N-methyl-p-toluidino)fluoran | 1 g. |
| 5 % Aqueous hydroxyethyl cellulose solution | 4 g. |
| 20 % Aqueous styrene-maleic anhydride solution | 3.75 g. |
| Water | 2.2 g. |
| **Liquid B:** | |
| 4,4'-Isopropylidene diphenol | 5 g. |
| 5 % Aqueous hydroxyethyl cellulose solution | 20 g. |
| 20 % Aqueous styrene-maleic anhydride copolymer solution | 18.75 g. |
| Water | 11 g. |

The above-mentioned liquids A and B were individually pulverized in the same manner as in Example 1 and then mixed with each other. The mixed liquid was sufficiently mixed with 20 g. of a 50 % flour starch dispersion, 5 g. of a 20 % wax emulsion (trade name "Repol No. 50" produced by Daikyo Kagaku K.K.) and 14 g. of a 10 % aqueous p-bis(1,2-epoxyethyl) benzene [the compound (5)] as a hardener to form a heat-sensitive coating liquid. This coating liquid was coated on an ordinary paper having a basis weight of 50 g/m$^2$, so that the amount of the coated liquid after drying became about 5.5 g/m$^2$, to obtain a heat-sensitive recording sheet. This recording sheet was sufficiently high in water resistance, and the coating formed thereon was not peeled off even when wetted with water and then rubbed with a finger. Further, the recording sheet was extremely less in texture coloration and thus was high in effect of prevention of texture coloration, and gave a brilliant green image.

What is claimed is:

1. In a heat-sensitive recording composition comprising a normally colorless or somewhat pale-colored chromogenic substance, a phenolic substance capable of developing the color of said chromogenic substance at an elevated temperature, and a water-soluble binder, the improvement wherein a compound having 2 to 10 1,2-epoxy ring structures

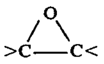

is added as a hardener to the composition.

2. A composition according to claim 1, wherein the compound having epoxy ring structures is selected from the group consisting of:

(1) 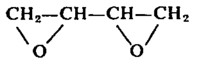

(2) 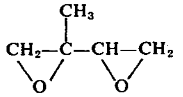

(3) 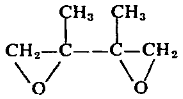

(4) 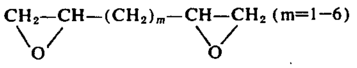

(5) 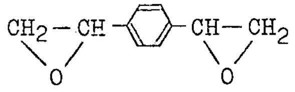

(6) 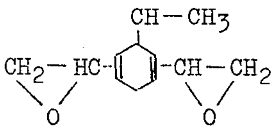

(7) 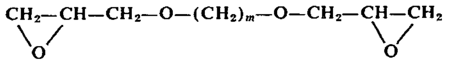

(m=2–10)

(8) 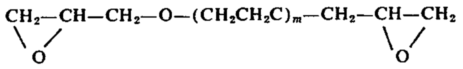

(m=2,3)

(9) 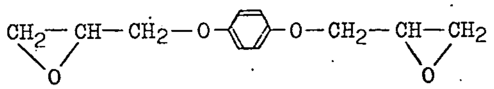

(10) 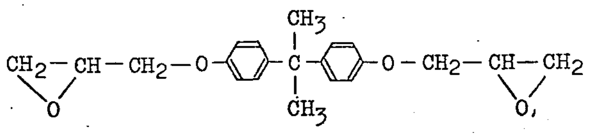

(11) 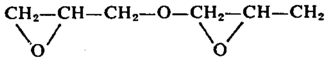

(12) 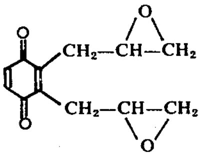

(13) 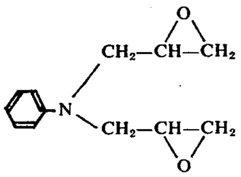

(14) 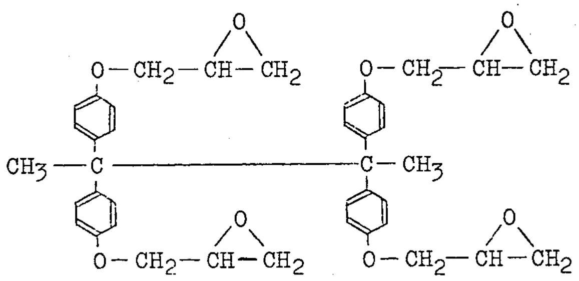

(15) 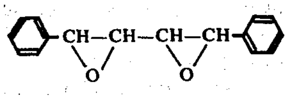

3. A composition according to claim 1, wherein the amount of the hardener is 0.1 to 30 % by weight based on the weight of the water-soluble binder.

4. A composition according to claim 1, wherein the amount of the hardener is 0.5 to 20 % by weight based on the weight of the water-soluble binder.

5. A composition according to claim 1, wherein the phenolic substance has at least two hydroxy groups in one molecule.

6. A heat-sensitive recording sheet which comprises a support and, coated thereon, the heat-sensitive recording composition defined in claim 1.

7. A heat-sensitive recording sheet according to claim 6, wherein the compound having epoxy ring structures is selected from the group consisting of:

(1) 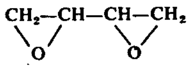

(2) 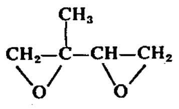

(3) 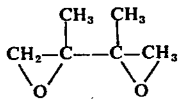

(4) 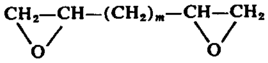 (m=1–6)

(5) 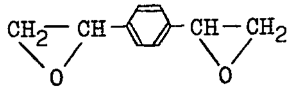

(6) 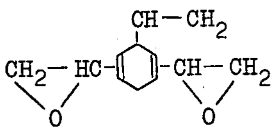

(7) 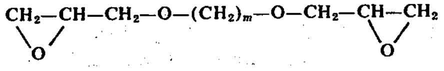

(m=2–10)

(8) 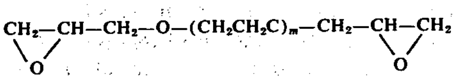

(m=2,3)

(9) 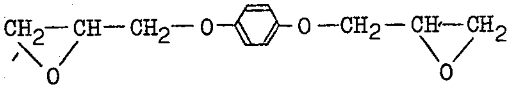

(10) 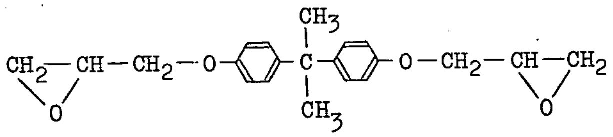

(11) 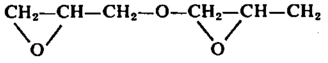

(12) 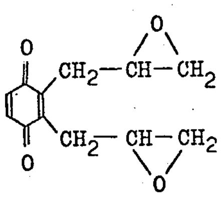

(13) 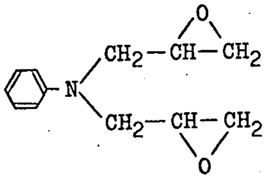

(14) 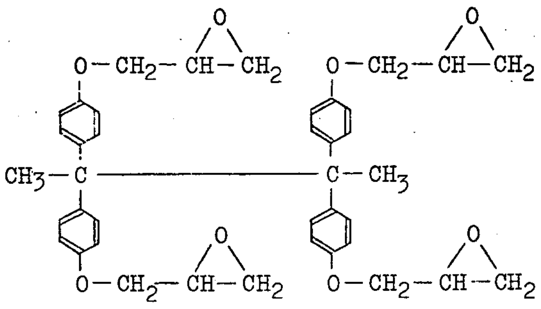

(15) 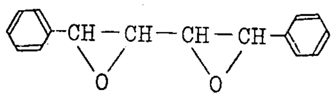

8. A heat-sensitive recording sheet according to claim 6, wherein the amount of the hardener is 0.5 to 30 % by weight based on the weight of the water-soluble binder.

9. A heat-sensitive recording sheet according to claim 6, wherein the amount of the hardener is 0.5 to 20 % by weight based on the weight of the water-soluble binder.

10. A heat-sensitive recording sheet according to claim 6, wherein the phenolic substance has at least two hydroxy groups in one molecule.

11. A composition according to claim 1, wherein the water-soluble binder is selected from the group consisting of polyvinyl alcohol, methyl cellulose, hydroxyethyl cellulose, gum arabic, gelatin, styrene-maleic anhydride copolymer and acrylic resin.

12. A composition according to claim 11, wherein the amount of the hardener is 0.1 to 30% by weight based on the weight of the water-soluble binder.

13. A composition according to claim 11, wherein the water soluble binder is hydroxyethyl cellulose.

14. A composition according to claim 11, wherein the water soluble binder is styrene-maleic anhydride copolymer.

* * * * *